US012560696B2

(12) United States Patent　　　　(10) Patent No.: US 12,560,696 B2
Zhou et al.　　　　　　　　　　　　(45) Date of Patent: Feb. 24, 2026

(54) RADAR TRACKING ASSOCIATION WITH VELOCITY MATCHING BY LEVERAGING KINEMATICS PRIORS

(71) Applicant: GM CRUISE HOLDINGS LLC, San Francisco, CA (US)

(72) Inventors: Zhengrong Zhou, San Francisco, CA (US); Shaogang Wang, Pittsburgh, PA (US); Brian Pierce, Trinity, FL (US)

(73) Assignee: GM Cruise Holdings LLC, San Francisco, CA (US)

( * ) Notice: Subject to any disclaimer, the term of this patent is extended or adjusted under 35 U.S.C. 154(b) by 451 days.

(21) Appl. No.: 17/554,624

(22) Filed: Dec. 17, 2021

(65) Prior Publication Data

US 2023/0194692 A1　　Jun. 22, 2023

(51) Int. Cl.
*G01S 13/58*　　　　(2006.01)
*G01S 13/86*　　　　(2006.01)
*G01S 13/931*　　　(2020.01)

(52) U.S. Cl.
CPC ............ *G01S 13/58* (2013.01); *G01S 13/865* (2013.01); *G01S 13/867* (2013.01); *G01S 13/931* (2013.01)

(58) Field of Classification Search
CPC ....... G01S 13/58; G01S 13/865; G01S 13/867
See application file for complete search history.

(56) References Cited

U.S. PATENT DOCUMENTS

| | | | | |
|---|---|---|---|---|
| 11,210,537 | B2 * | 12/2021 | Koivisto | ............... B60W 50/00 |
| 11,676,364 | B2 * | 6/2023 | Xu | ........................ G05D 1/0088 |
| | | | | 382/104 |
| 11,914,023 | B2 * | 2/2024 | Wang | ........................ G01S 7/418 |
| 2017/0067991 | A1 * | 3/2017 | Liu | .......................... G01S 13/87 |
| 2017/0285161 | A1 * | 10/2017 | Izzat | ...................... G01S 17/931 |
| 2019/0101399 | A1 * | 4/2019 | Sunil Kumar | ..... G01C 21/3815 |
| 2019/0147610 | A1 * | 5/2019 | Frossard | ................ G06N 3/045 |
| | | | | 382/103 |
| 2019/0258878 | A1 * | 8/2019 | Koivisto | .................. G05D 1/00 |
| 2020/0160559 | A1 * | 5/2020 | Urtasun | .................. G06N 3/09 |
| 2021/0237761 | A1 * | 8/2021 | Das | ........................ G01S 13/867 |
| 2021/0237779 | A1 * | 8/2021 | Das | ........................ G08G 1/0129 |
| 2022/0214425 | A1 * | 7/2022 | Yoffe | ..................... G01S 13/584 |
| 2022/0350018 | A1 * | 11/2022 | Alferdaous Alazem | ..................... G01S 17/95 |
| 2022/0373671 | A1 * | 11/2022 | Wang | ........................ G01S 7/418 |
| 2023/0036838 | A1 * | 2/2023 | Slobodyanyuk | .... B60W 60/001 |
| 2023/0131721 | A1 * | 4/2023 | Chebiyyam | ............. G01S 7/412 |
| | | | | 356/4.01 |

* cited by examiner

*Primary Examiner* — Marcus E Windrich

(74) *Attorney, Agent, or Firm* — Honigman LLP; Matthew H. Szalach; Jonathan P. O'Brien

(57) ABSTRACT

The present disclosure is directed to focusing processing resources of a radar apparatus to radar data associated with specific locations around an autonomous vehicle (AV). Data associated with a type of sensing apparatus that is not a radar (e.g. a camera and/or a LiDAR apparatus) that tracks motion of specific objects around the AV may be used by a processor to identify specific sets of radar data to process. Locations associated with a specific set of tracked objects may be used to identify sets of received radar signals that will be processed by the radar apparatus. Radar signals received by the radar apparatus that are associated with locations that do not correspond to a location of a tracked object may be ignored by the radar apparatus to reduce a number of computational tasks that a processor of the radar apparatus must process.

17 Claims, 5 Drawing Sheets

Segment the Area Around the Vehicle Into a Grid of Cells
410

Transmit Sets of Radar Signals
420

Receive Sets Reflected Radar Signals
430

Associate Sets of Received Radar Signals with the Tracked Object Data
440

Process Sets of Received Radar Signals that are Associated with the Tracked Object Data
450

RADAR TRACKING ASSOCIATION WITH VELOCITY MATCHING BY LEVERAGING KINEMATICS PRIORS

BACKGROUND

1. Technical Field

The present disclosure is generally related to evaluating data from different types of sensing apparatus. More specifically, the present disclosure is directed to methods and apparatus that minimize a number of computations required to track objects around an autonomous vehicle (AV).

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
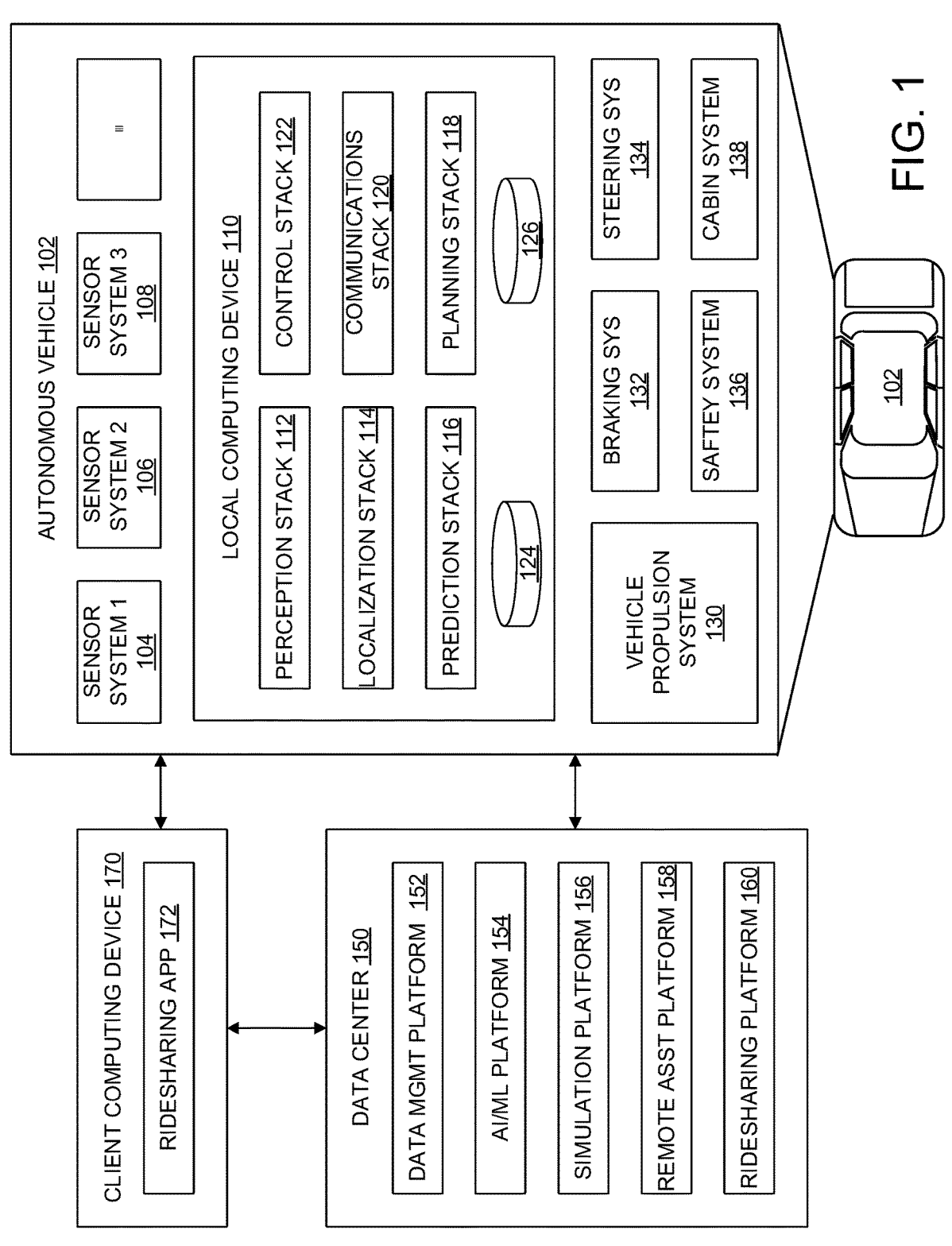
FIG. 1 illustrates an example of a system for managing one or more Autonomous Vehicles (AVs) in accordance with some aspects of the present technology.

The present disclosure is directed to combining the strengths of different methods of analyzing collected sensor data to reduce/mitigate the risk of an automated vehicle (AV) impacting an object. This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and generating a forecast of future motion of that object. This forecast may be based on an analysis that compares the data that tracks the motion of objects with the current sensor data as part of a process that generates a risk probability. When the risk probability meets or exceeds a threshold level, a corrective action may be initiated. Methods of the present disclosure may be performed at least in part by a processor executing instructions out of a memory.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

A radar apparatus installed at a vehicle commonly include antennas that point in a direction in front of the vehicle. As the vehicle moves along a roadway emitting electromagnetic (EM) energy and receiving reflected set of EM energy. The processing of radar signals data is typically more computationally intensive than evaluating object data sensed by other types of sensing apparatuses such as a camera apparatus of a light detection and ranging (LiDAR) apparatus. A radar apparatus typically has the ability to monitor motion (e.g. relative position and/or velocity) to a greater degree of accuracy than a camera or LiDAR apparatus. New solutions are needed to leverage the strengths of different sensing types, while minimizing computational loads associated with the processing of radar signals.

The present disclosure is directed to focusing processing resources of a radar apparatus to radar data associated with specific locations around an autonomous vehicle (AV). Data associated with a type of sensing apparatus that is not a radar (e.g. a camera and/or a LiDAR apparatus) that tracks motion of specific objects around the AV may be used by a processor to identify specific sets of radar data to process. Locations associated with a specific set of tracked objects may be used to identify sets of received radar signals that will be processed by the radar apparatus. Radar signals received by the radar apparatus that are associated with locations that do not correspond to a location of a tracked object may be ignored by the radar apparatus to reduce a number of computational tasks that a processor of the radar apparatus must process.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes;

etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152;

select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements and/or static elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Methods of the present disclosure may separate an area around the radar apparatus into a grid pattern that includes a plurality of cells. Objects tracked by one type of sensing apparatus (e.g. a camera and/or LiDAR apparatus) and/or predicted by the sensing apparatus may be associated with particular cells of the grid and a processor that processes radar signal data may only process radar signals associated with the particular cells of the grid.

Figure 2:
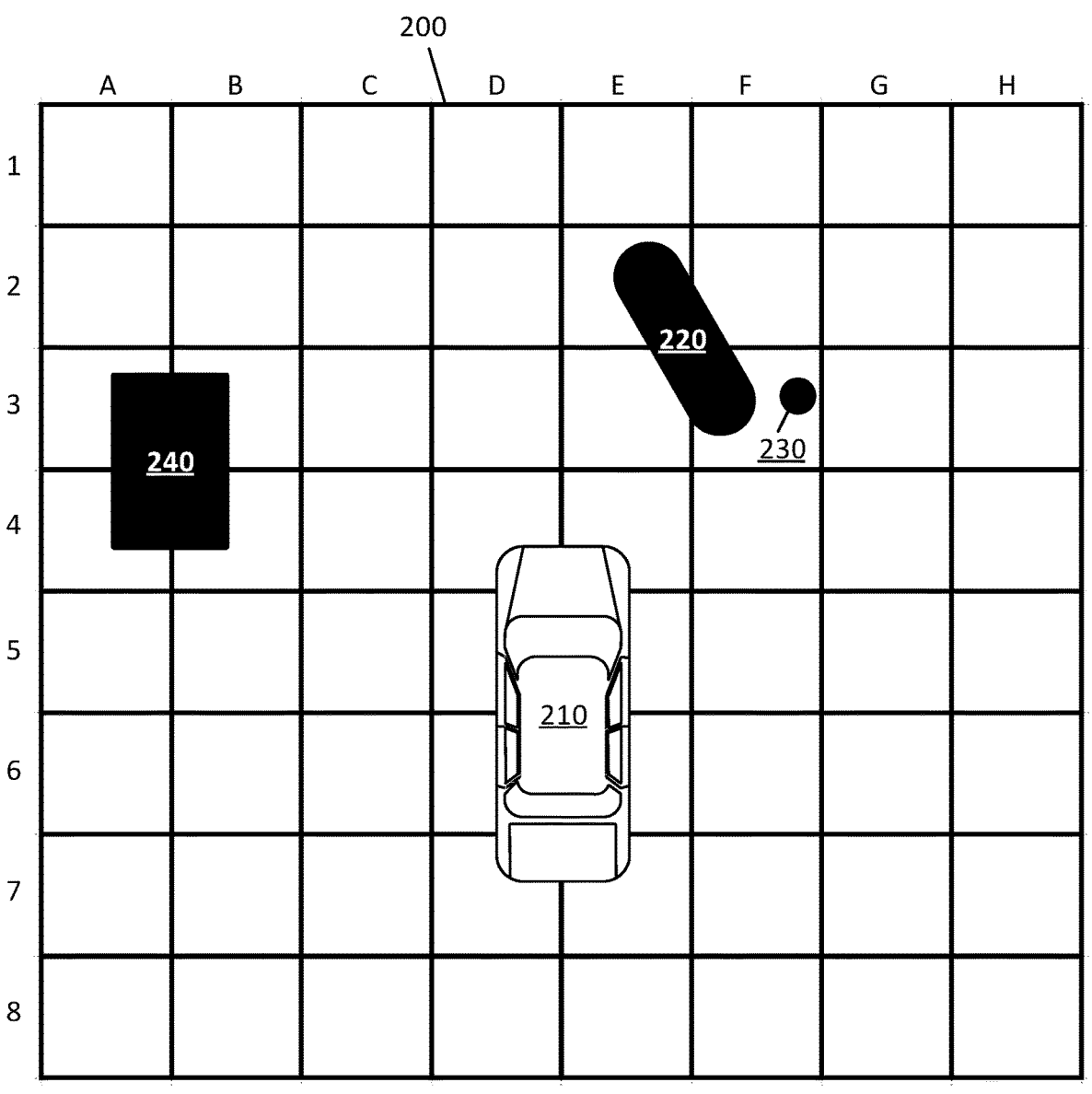
FIG. 2 illustrates a grid around a vehicle that includes a plurality of discrete cells, where some of those cells include a tracked object.

FIG. 2 illustrates a grid around a vehicle that includes a plurality of discrete cells, where some of those cells include a tracked object. FIG. 2 includes grid 200, vehicle 210, and object 220. Note that each of the cells of FIG. 2 are associated with both a letter and a number, where letters have been assigned to columns of the grid 200 and numbers have been assigned to rows of the grid 200. Object 220 is located in cells E2, E3, F2, and F3 of grid 200. Note that the grid 200 is drawn from a perspective above the vehicle, i.e. a two-dimensional bird's eye view of an area around vehicle 210. FIG. 2 also includes object 230 that may be an object that is stationary relative to the roadway along which vehicle 220 is moving. Another object included in FIG. 2 is object 240. Objects 230 and 240 may be objects that are not classified as a "tracked object" by a tracking apparatus at vehicle 210.

A radar apparatus located at an AV may be considered with a first type of sensing apparatus of a sensing system at an AV and a second type of sensing apparatus at the AV may use sensors that do not use radar signals. When the first type of sensing apparatus is a radar apparatus, the second type of sensing apparatus may be a camera apparatus or a LiDAR apparatus. Here, data collected by the camera and/or LiDAR apparatus may be used to identify where object 220 is located relative to vehicle 210. Initially this location may be associated with one or more distances from the vehicle and possibly a velocity based on camera and/or LiDAR data and/or predictions performed by the sensing apparatus.

Such a camera apparatus may include one or more cameras that may collect data from an area around a vehicle. This area may include an entire 360 degrees around the vehicle and this area may correspond to a distance that corresponds to a range of a radar apparatus or operating mode of the radar apparatus. Alternatively, or additionally a sensing apparatus may transmit and receive LiDAR signals. Here again, the area may include an entire 360 degrees around the vehicle and this area may correspond to a distance that corresponds to a range of a radar apparatus or operating mode of the radar apparatus.

A sensing system may include different types of sensing apparatus (e.g. camera or LiDAR, radar, or each of these) may collect data associated with objects that are being tracked by the sensing apparatus. Movement data collected by the sensing apparatus may be provided to a processor that implements the function of tracking specific tracked objects. This movement data may be generated based on an analysis of data received by the aforementioned camera apparatus or LiDAR apparatus or both.

To associate the tracking data with the reflected radar data, a mapping may be made by the processor or a second processor that includes an area around the vehicle. This may include overlaying a grid pattern 200 over the area around the vehicle. Grid 200 includes a plurality of cells, much like the squares included on a set of graph paper. The size of individual cells of this grid 200 may correspond to a resolution of the radar apparatus or to a resolution of a current operational mode of the radar apparatus. Exemplary sizes of cells of grid 200 may be a meter square or half a meter by half a meter. As the vehicle 210 moves down a roadway, the radar apparatus at vehicle 210 may transmit radar signals and receive reflections of those transmitted radar signals. Here some of the reflected radar signals may be associated with the specific objects tracked by the processor and other reflected radar signals may be associated with other objects that are not being tracked by the processor.

Movement information identifying a current location of an object may be associated with the graph and sets of reflected radar signals may be associated with locations that may include one or more cells of the grid pattern 200. When a location of a particular object that is being tracked is associated with a first set of cells and when a particular set of reflected radar signals are also associated with the same set of cells, data associated with two different types of sensing systems overlap at a same location (i.e. the location of the first set of cells). While some of the radar energy associated with the set of cells should be radar signals that reflected off of the object tracked by the camera and/or LiDAR tracking system, it is still possible that other portions of received radar energy associated with this set of cells could have been received after reflecting off of a second object. Further analysis could be performed to discriminate between the tracked object and the second object. This analysis could identify that a first set of reflected radar data located at these set of cells is associated with the tracked object (e.g. a bicycle) and that a second set of reflected radar data located at these set of cells is associated with a stationary object (e.g. a lamp post).

After the grid 200 has been generated, a processor may evaluate received reflection radar signal data associated with locations of cells E2, E3, F2, and F3 of grid 200 based on an overlapping of tracked location data with the locations of the received radar signal data. Radar signals associated with objects that are not being tracked by the camera and/or LiDAR apparatus may be ignored by the processor of the radar apparatus. For example, the processor of the radar apparatus may ignore any radar signals reflected off object 240 of because it is not a "tracked object."

Since cell F3 of grid 200 includes part of object 220 and includes object 230, radar data reflected off both object 220 and object 230 may be evaluated by the processor of the radar apparatus. Here, the processor of the radar apparatus may identify that object 220 is moving and that object 230 is stationary relative to the roadway by comparing radar signal data associated with different sets of transmitted and received radar signals. This may allow the processor of the radar apparatus to identify that object 230 is not the object being tracked by the camera and/or LiDAR apparatus and that object 220 is the tracked object associated with cells E2, E3, F2, and F3 of grid 200.

Figure 3:
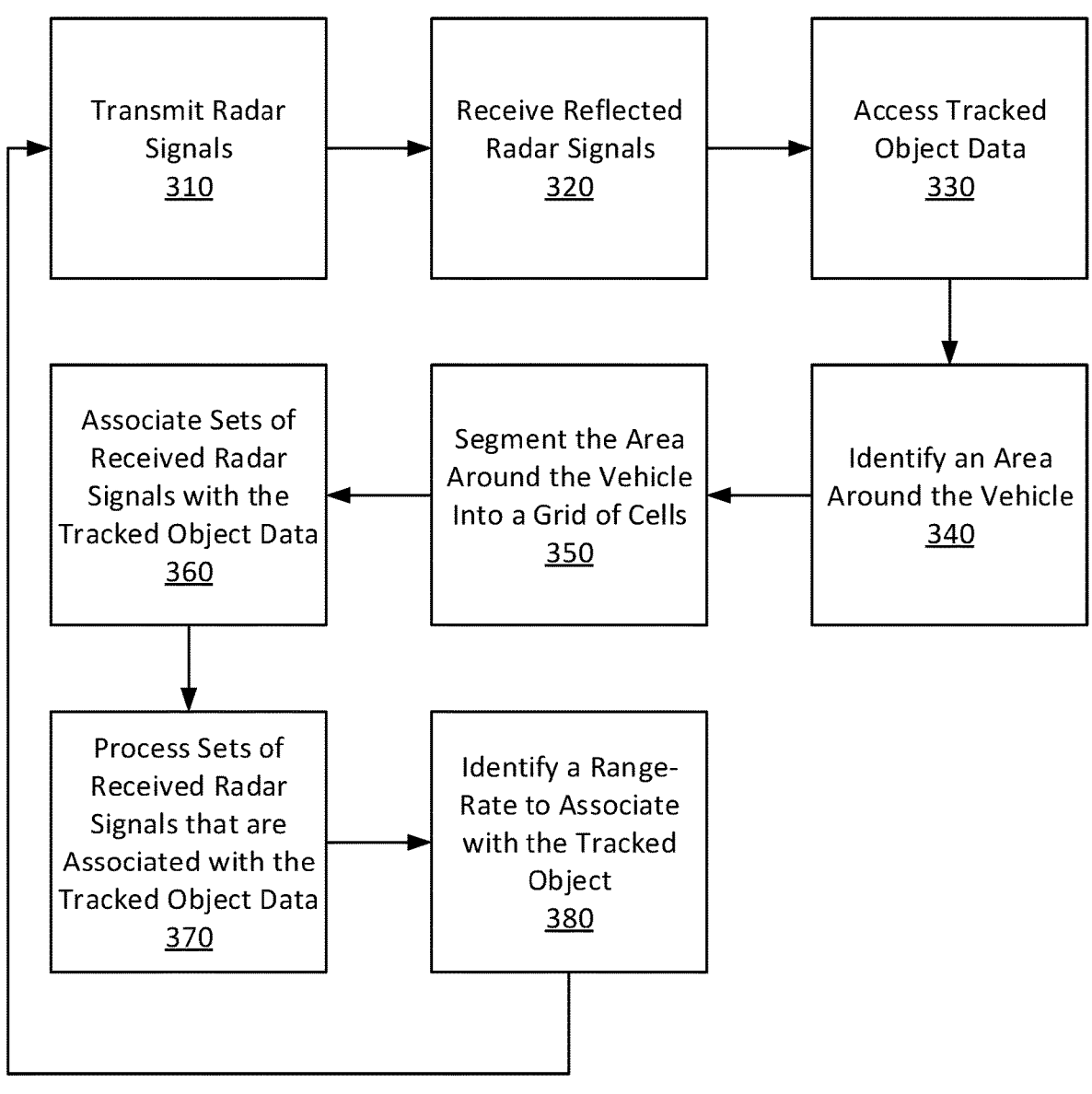
FIG. 3 illustrates a series of steps that may be performed at sensing system of an autonomous vehicle (AV).

FIG. 3 illustrates a series of steps that may be performed at sensing system of an autonomous vehicle (AV). As discussed above, an AV may include several different types of sensing apparatus such as a radar apparatus, a camera apparatus, and/or a LiDAR apparatus. A combination of these exemplary apparatus may be included in a single system that senses and tracks objects in ways where the strengths of one type of apparatus augment or compensate for limitations of another type of apparatus. For example, a processor of a camera apparatus and/or a LiDAR apparatus at an AV may be capable of identifying objects that should be tracked by a sensing system using less computations than a processor of a radar apparatus. A processor of a first sensing apparatus may identify that a moving object should be tracked based on an initial analysis, this processor may then perform an evaluation that generates or that updates tracking data of that object. This evaluation may be performed by the processor executing instructions of a set of program code that may be referred to as tracking code. Execution of the instructions of the tracking code may allow data prepared by the processor to be evaluated by that processor or another processor that executes instructions that process data associated with received radar signals.

Step 310 of FIG. 3 is a step where radar signals are transmitted from an antenna of a radar apparatus and then reflections of the transmitted radar signals may be received by that antenna or another antenna of the radar apparatus at step 320 of FIG. 3. These radar signals may have been transmitted and received by a radar apparatus that may be considered a first type of sensing apparatus of the sensing system of the AV discussed in respect to FIGS. 1-2. One of the processors at the sensing system may access the tracked object data (tracking data) at step 330 of FIG. 3. This tracking data may identify a location and a velocity of a tracked object that was identified by a second sensing apparatus of the sensing system (e.g. a camera or LiDAR apparatus).

One of the processors at the sensing system may then identify an area around the AV in step 340 and segment that area into a grid of cells in step 350 of FIG. 3. This grid of cells may be like the grid 200 that includes many cells discussed above in respect to FIG. 2. Next, in step 360, the processor may identify sets of the received radar signals to associated with the tracked object data that was accessed in step 330. As discussed in respect to FIG. 2, a location of object 220 may be associated with cells E2, E3, F2, and F3 of grid 200. The association of the tracked object data with a set of the received radar signals may be performed by the processor comparing location data from one sensing apparatus (e.g. a camera and/or LiDAR apparatus) with location data associated with a radar apparatus. Locations where the radar signal location data overlaps with the tracked object location data may be used to identify radar signal data that should be processed. A processor of the sensing system may then process in the sets of radar signals associated with the tracked object data in step 370. The processing of these sets of received radar signals in step 370 may allow the processor to identify a range and/or a range-rate to associate with the tracked object in step 380 of FIG. 3.

Data associated the range and/or range-rate identified in step 380 may include data that identifies one or more distances and one or more velocities to associate with one or more objects located in an area around the vehicle that corresponds to the tracked object data of step 330. While steps 370 and 380 are discussed above, these steps may not be required as discrete steps.

As mentioned above, methods of the present disclosure may rely on the use of different types of sensing apparatus one that relies on more computations and that derives greater accuracy (e.g. a radar apparatus) and a second that relies on data collected by a less computational intensive type of apparatus (e.g. a camera and/or a LiDAR apparatus) that may be associated with a relatively lower accuracy. By combining the strengths of each respective type of apparatus a two-stage associator may provide the benefits of both high efficiency and precision. Here, a first stage is may be a spatial association leverages the grid-based solution, reviewed above, to reduce the computational complexity from O(M*N) to O(M+N) since grid size K may not be relevant, where M is a number of points, N is a number of tracks, and K is a grid size. Here a second stage of this associator may be a range-rate association for which a range-rate measurement is identified based on the operation of a range-rate simulation model. For example, a "bicycle model" may be used to project the track prior object kinematic data into observation space of a radar. This application of the "bicycle model" may allow for the matching of the range-rate such that a sensing apparatus may more effectively eliminate the false associations of the first stage associator.

In certain instances, velocities of a tracked object may include different points that may move in a same direction with a same velocity or that may move in slightly different directions with different velocities. This is because an object may move only in one linear direction, may rotate, or may have motion that includes both linear and rotational components. Location data and velocity data associated with different points of an object may be used to identify whether an object is moving in a straight line, is rotating, or is moving in a direction while rotating. Rotational components of velocity may be identified by identifying that a first point and a second point of an object are moving with different velocities along vectors that may be in different directions.

Methods of the present disclosure may include steps that include identifying a first location of a first point of the first object based on the processing of the sets of the reflected radar signals, identifying a second location of the first point of the first object based on the processing of the sets of reflected radar signals, and identifying a first velocity to associated with the first object based on the first point of the first object moving from the first location of the first point to the second location of the first point in a time frame. These methods may also include the steps of identifying a first location of a second point of the first object based on the processing of the sets of the reflected radar signals, identifying a second location of the second point of the first object based on the processing of the sets of reflected radar signals, and identifying a second velocity with the first object based on the second point of the first object moving from the first location of the second point to the second location of the second point in the time frame.

These methods may include steps of:

1. Spatially associating radar detection data included in sets of reflected radar signal data with grid cells of a grid of FIG. 2. This association of the sets of reflected radar signals to the grid may efficiently be accomplished by exploiting the spatially sparce nature of sets of reflected radar signals;

2. Spatially associating particular sets of tracked object data with particular cells of the grid of FIG. 2. This association of the sets of tracked object data to the grid may efficiently be accomplished by exploiting the spatially sparce nature of the sets of tracked object data;

3. With the grid as the intermediate association media as created above in steps 1 and 2, the sets of reflected radar signals may be associated with tracked object data in the spatial domain. As a result of step 1 and 2, the efficiency of the spatial association between the sets of reflected radar signals and the sets of tracked object data may be accomplished by exploiting the sparse nature of both the sets of reflected radar signals and the sets of tracked object data, hence achieving a theoretical association efficiency boundary of O(M+N); and 4. Evaluating a full set of kinematics. The evaluation of this full set of kinematics data may include, yet may not be limited to linear and rotational kinematics, of the tracked object data, and dynamic data, including the doppler and range-rate, of the sets of reflected radar signals are utilized to further refine the association between the sets of reflected radar signals and the tracked object data. This further refinement stage may be applied depending on a specific operational environment of an AV; hence the first association stage from steps 1 to 3 and this second association stage of step 4 can be applied together or separately to deliver a desired AV performance in a given environment where the AV is driving.

Figure 4:
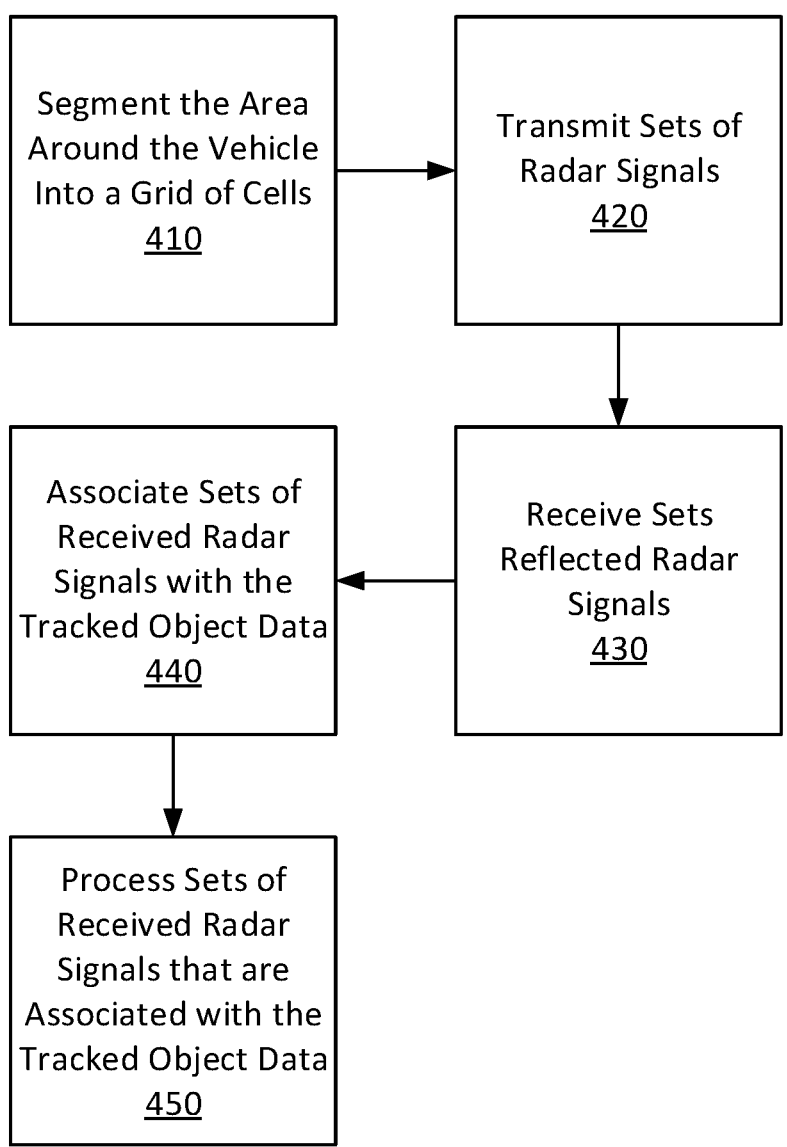
FIG. 4 illustrates another series of steps that may be performed at a sensing system of an autonomous vehicle (AV).

A linear velocity may be identified when a first velocity of a first point of an object matches a second velocity of a second point of the object. A rotational velocity may be identified when the first velocity of the first point of the object is different from a velocity of the second point of the object that is different from the first velocity. FIG. 4 illustrates another series of steps that may be performed at a sensing system of an autonomous vehicle (AV). The steps performed in FIG. 4 may be performed by a processor that executes instructions out of a memory. Step 410 of FIG. 4 is a step where an area around an AV is segmented into a grid of cells as shown and discussed in respect to FIGS. 2 & 3 this grid may include a plurality of cells. As discussed in respect to FIG. 2, a location of object 220 may be associated with cells E2, E3, F2, and F3 of grid 200. The association of the tracked object data with a set of the received radar signals may be performed by the processor comparing location data from one sensing apparatus (e.g. a camera and/or LiDAR apparatus) with location data associated with a radar apparatus. This sensing system may include different types of sensing apparatus, such as a camera, a LiDAR apparatus, and a radar apparatus.

Next, in step 420 of FIG. 4 sets of radar signals may be transmitted from the radar apparatus. This may be performed by providing an amplified signal to an antenna that transmits the radar signal. After the transmitted radar signals bounce off objects around the vehicle, reflections of those radar signals may be received in step 430 of FIG. 4. Step 430 may include receiving a set of reflected radar signals for each respective set of transmitted radar signals in the area of the grid. These sets of received radar signals may correspond to an area of the grid that includes a first set of cells of the plurality of cells where a set of objects are located in the area of the grid. After step 430, the sets of reflected radar signals may be associated with tracking data that tracks movement of a first object in the area around the AV. Here, a first object may be identified as being located in the area of the grid that includes the first set of cells.

Locations where the radar signal location data overlaps with the tracked (i.e. the first object) object, location data may be used to identify radar signal data that should be processed. A processor of the sensing system may then process data associated with the sets of radar signals in step 450 of FIG. 4. The processing of these sets of received radar signals in step 450 may allow the processor to identify a range-rate to associate with the tracked object as discussed in respect to FIG. 3.

Figure 5:
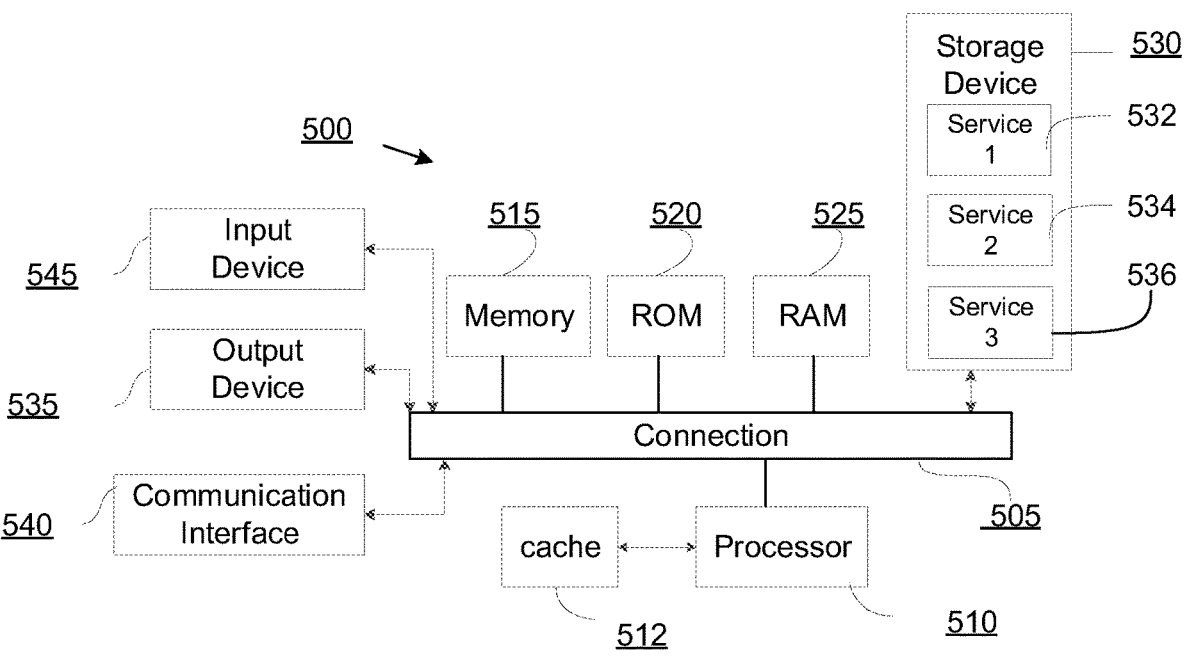
FIG. 5 shows an example of computing system that may be used to implement at least some of the functions reviewed in the present disclosure in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A method for evaluating tracked objects, the method comprising:

associating radar points of radar detection data included in sets of reflected radar signal data with respective first grid cells of a grid, the grid segmenting an area around an autonomous vehicle (AV) into grid cells;

associating particular sets of tracked object data with respective second grid cells of the grid, the tracked object data including information associated with motion of a first object as detected by at least one of a camera or a light detection and ranging (LiDAR) sensor; and based on determining that at least one of the first grid cells overlaps at least one of the second grid cells:

associating the radar points of the radar detection data included in the sets of reflected radar signal data with the particular sets of tracked object data;

processing only the radar points of the radar detection data associated with the particular sets of tracking object data together to identify a measurement to associate with the motion of the first object to reduce a number of computational tasks; and ignoring radar points included in the radar detection data that are associated with first grid cells that do not overlap the second grid cells.

2. The method of claim 1, further comprising:

identifying a first range rate measurement to associate with a first point of the sets of reflected radar signals associated with a first set of cells in the respective first grid cells;

identifying a second range rate measurement to associate with a second point of the sets of reflected radar signals associated with the first set of cells; and identifying that a set of objects that includes a second object located at the first set of cells based on the second range rate measurement being different from the first range rate measurement.

3. The method of claim 1, further comprising:

identifying a first location of a first point of the first object based on the processing of the sets of reflected radar signals;

identifying a second location of the first point of the first object based on the processing of the sets of reflected radar signals; and identifying a first velocity associated with the first object based on the first point of the first object moving from the first location of the first point to the second location of the first point in a time frame.

4. The method of claim 3, further comprising:

identifying a first location of a second point of the first object based on the processing of the sets of reflected radar signals;

identifying a second location of the second point of the first object based on the processing of the sets of reflected radar signals; and identifying a second velocity with the first object based on the second point of the first object moving from the first location of the second point to the second location of the second point in the time frame.

5. The method of claim 4, further comprising identifying a linear velocity and a rotational velocity associated with the first object based on the first velocity being different from the second velocity.

6. The method of claim 4, further comprising identifying a linear velocity based on the first velocity matching the second velocity.

7. The method of claim 4, further comprising identifying a rotational velocity based on the first velocity of the first point being associated with motion in a first direction and the second velocity being associated with motion of the second point being in a second direction.

8. The method of claim 1, wherein the grid is a two-dimensional grid from a perspective above the AV.

9. A non-transitory computer-readable storage medium having embodied thereon a program executable by a processor for implementing a method for evaluating tracked objects, the method comprising:

associating radar points of radar detection data included in sets of reflected radar signal data with respective first grid cells of a grid, the grid segmenting an area around an autonomous vehicle (AV) into grid cells;

associating particular sets of tracked object data with respective second grid cells of the grid, the tracked object data including information associated with motion of a first object as detected by at least one of a camera or a light detection and ranging (LiDAR) sensor; and based on determining that at least one of the first grid cells overlaps at least one of the second grid cells:

associating the radar points of the radar detection data included in the sets of reflected radar signal data with the particular sets of tracked object data;

processing only the radar points of the radar detection data associated with the particular sets of tracking object data together to identify a measurement to associate with the motion of the first object to reduce a number of computational tasks; and ignoring radar points included in the radar detection data that are associated with first grid cells that do not overlap the second grid cells.

10. The non-transitory computer-readable storage medium of claim 9, wherein the method further comprises:

identify a first range rate measurement to associate with a first point of the sets of reflected radar signals associated with a first set of cells in the respective first grid cells;

identify a second range rate measurement to associate with a second point of the sets of reflected radar signals associated with the first set of cells; and identify that a set of objects that includes a second object located at the first set of cells based on the second range rate measurement being different from the first range rate measurement.

11. The non-transitory computer-readable storage medium of claim 9, wherein the method further comprises:

identifying a first location of a first point of the first object based on the processing of the sets of reflected radar signals;

identifying a second location of the first point of the first object based on the processing of the sets of reflected radar signals; and identifying a first velocity associated with the first object based on the first point of the first object moving from the first location of the first point to the second location of the first point in a time frame.

12. The non-transitory computer-readable storage medium of claim 11, wherein the method further comprises:

identify a first location of a second point of the first object based on the processing of the sets of reflected radar signals;

identify a second location of the second point of the first object based on the processing of the sets of reflected radar signals; and identify a second velocity with the first object based on the second point of the first object moving from the first location of the second point to the second location of the second point in the time frame.

13. The non-transitory computer-readable storage medium of claim 12, wherein the method further comprises identifying a linear velocity and a rotational velocity associated with the first object based on the first velocity being different from the second velocity.

14. The non-transitory computer-readable storage medium of claim 12, wherein the method further comprises identifying a linear velocity based on the first velocity matching the second velocity.

15. The non-transitory computer-readable storage medium of claim 12, wherein the method further comprises identifying a rotational velocity based on the first velocity of the first point being associated with motion in a first direction and the second velocity being associated with motion of the second point being in a second direction.

16. The non-transitory computer-readable storage medium of claim 9, wherein the grid is a two-dimensional grid from a perspective above the AV.

17. A system for evaluating tracked objects, the system comprising:

one or more memories; and one or more processors that execute instructions stored on the one or more memories to:

associate radar points of radar detection data included in sets of reflected radar signal data with respective first grid cells of a grid, the grid segmenting an area around an autonomous vehicle (AV) into grid cells;

associate particular sets of tracked object data with respective second grid cells of the grid, the tracked object data including information associated with motion of a first object as detected by at least one of a camera or a light detection and ranging (LiDAR) sensor; and based on determining that at least one of the first grid cells overlaps at least one of the second grid cells:

associate the radar points of the radar detection data included in the sets of reflected radar signal data with the particular sets of tracked object data;

process only the radar points of the radar detection data associated with the particular sets of tracking object data together to identify a measurement to associate with the motion of the first object to reduce a number of computational tasks; and ignore radar points included in the radar detection data that are associated with first grid cells that do not overlap the second grid cells.

* * * * *